United States Patent
Hoffmann et al.

(10) Patent No.: US 7,812,966 B2
(45) Date of Patent: Oct. 12, 2010

(54) METHOD OF DETERMINING THE DEPTH PROFILE OF A SURFACE STRUCTURE AND SYSTEM FOR DETERMINING THE DEPTH PROFILE OF A SURFACE STRUCTURE

(75) Inventors: Frank Hoffmann, Freiberg (DE); Knut Voigtlaender, Dresden (DE)

(73) Assignee: Infineon Technologies AG, Neubiberg (DE)

( * ) Notice: Subject to any disclaimer, the term of this patent is extended or adjusted under 35 U.S.C. 154(b) by 260 days.

(21) Appl. No.: 11/847,830

(22) Filed: Aug. 30, 2007

(65) Prior Publication Data

US 2009/0059239 A1 Mar. 5, 2009

(51) Int. Cl.
G01B 9/02 (2006.01)

(52) U.S. Cl. ..................................... 356/516
(58) Field of Classification Search ............... 356/504, 356/516, 479, 497
See application file for complete search history.

(56) References Cited

U.S. PATENT DOCUMENTS

| | | | | |
|---|---|---|---|---|
| 4,618,262 A | * | 10/1986 | Maydan et al. | 356/504 |
| 5,956,142 A | * | 9/1999 | Muller et al. | 356/504 |
| 6,028,669 A | * | 2/2000 | Tzeng | 356/504 |
| 6,413,867 B1 | | 7/2002 | Sarfaty et al. | |
| 6,589,869 B2 | | 7/2003 | Sarfaty et al. | |
| 6,972,848 B2 | * | 12/2005 | Usui et al. | 356/503 |
| 2002/0119660 A1 | | 8/2002 | Sarfaty et al. | |

FOREIGN PATENT DOCUMENTS

EP    1 111 356 A2    6/2001
WO    WO 03/102502 A1    12/2003

OTHER PUBLICATIONS

Bartha, J. W., Tutorial Part III: "Film related properties (optical measurement)," AEC/APC Workshop Europe, Apr. 18, 2001, 40 pages, AEC/APC, Dresden, Germany.

Tiede, R., "DeepUV EyeD for 200mm DPS(+)," Applied Materials Europe, Apr. 12, 2006, 10 pages, Applied Materials, Dresden, Germany.

* cited by examiner

*Primary Examiner*—Hwa S. A Lee
(74) *Attorney, Agent, or Firm*—Slater & Matsil, L.L.P.

(57) ABSTRACT

According to one embodiment of the present invention, a method of determining the depth profile of a surface structure includes: irradiating the surface structure with irradiation light including light components of different wavelengths; and determining the depth profile of the surface structure in dependence on interferometric effects caused by the reflection of the irradiation light at the surface structure.

19 Claims, 5 Drawing Sheets

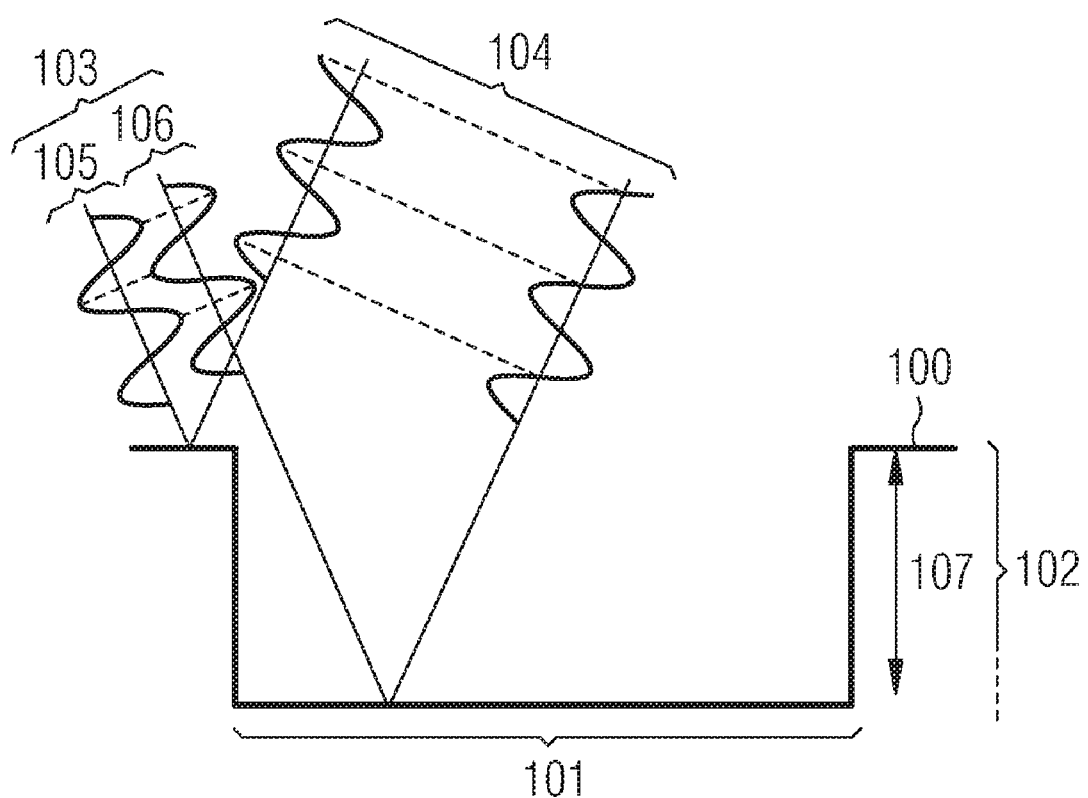

FIG 2A
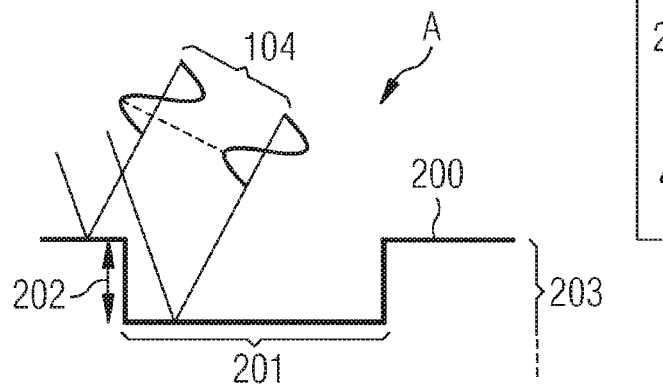
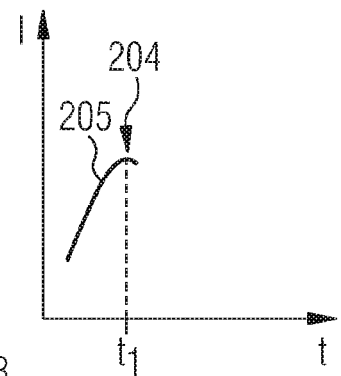
FIG 2B
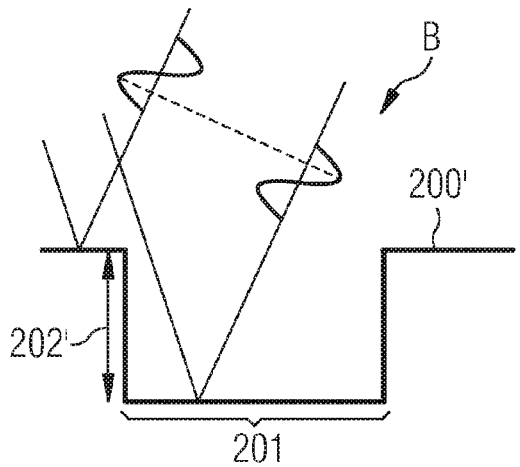
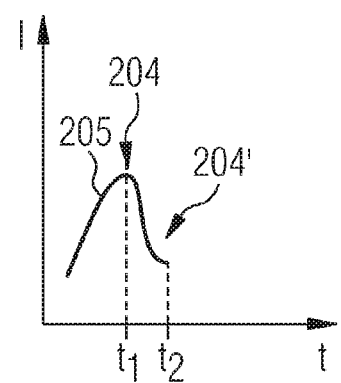
FIG 2C
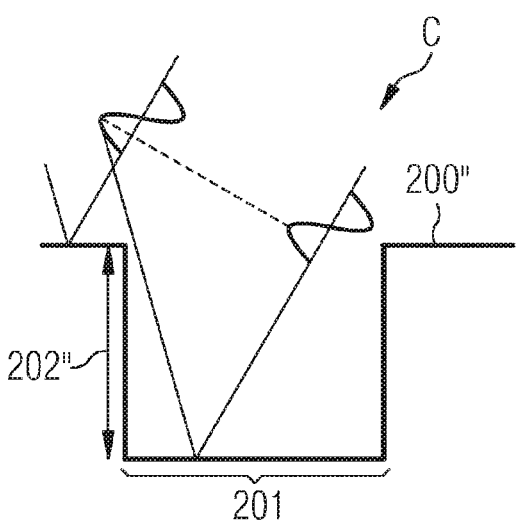
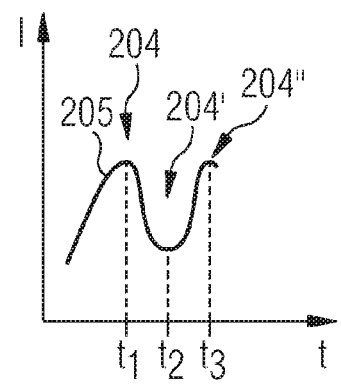

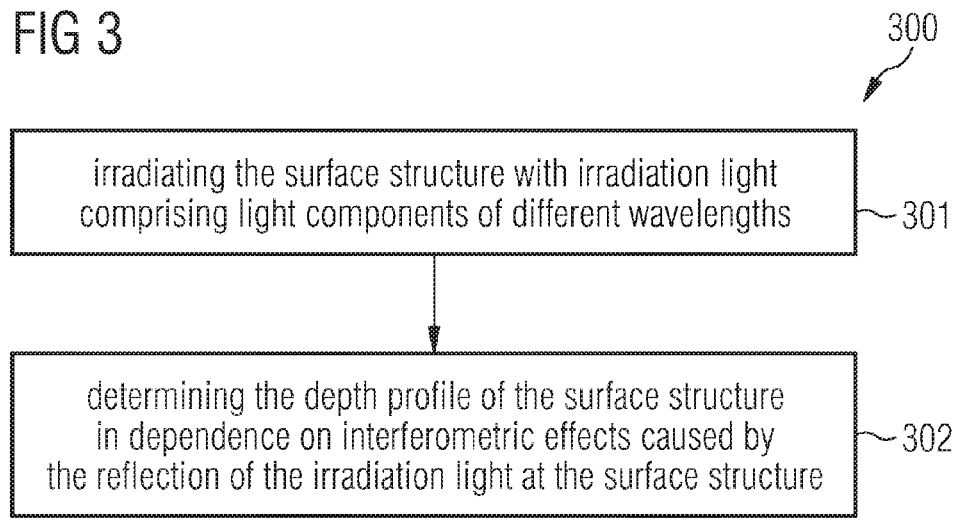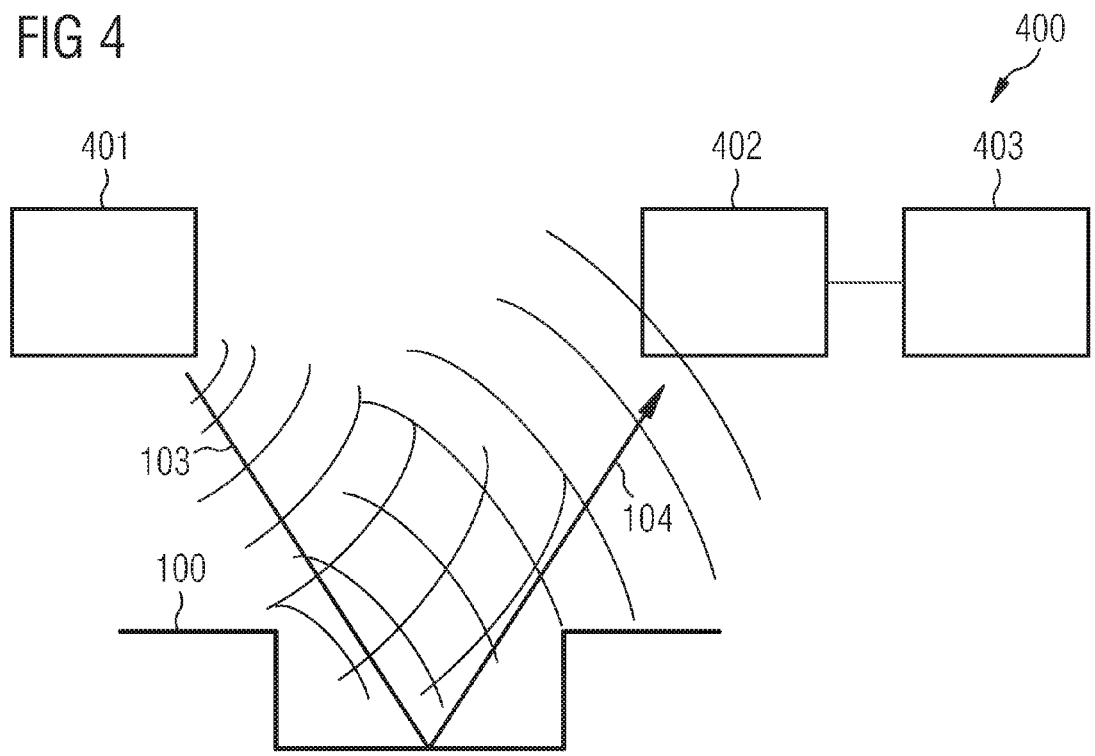

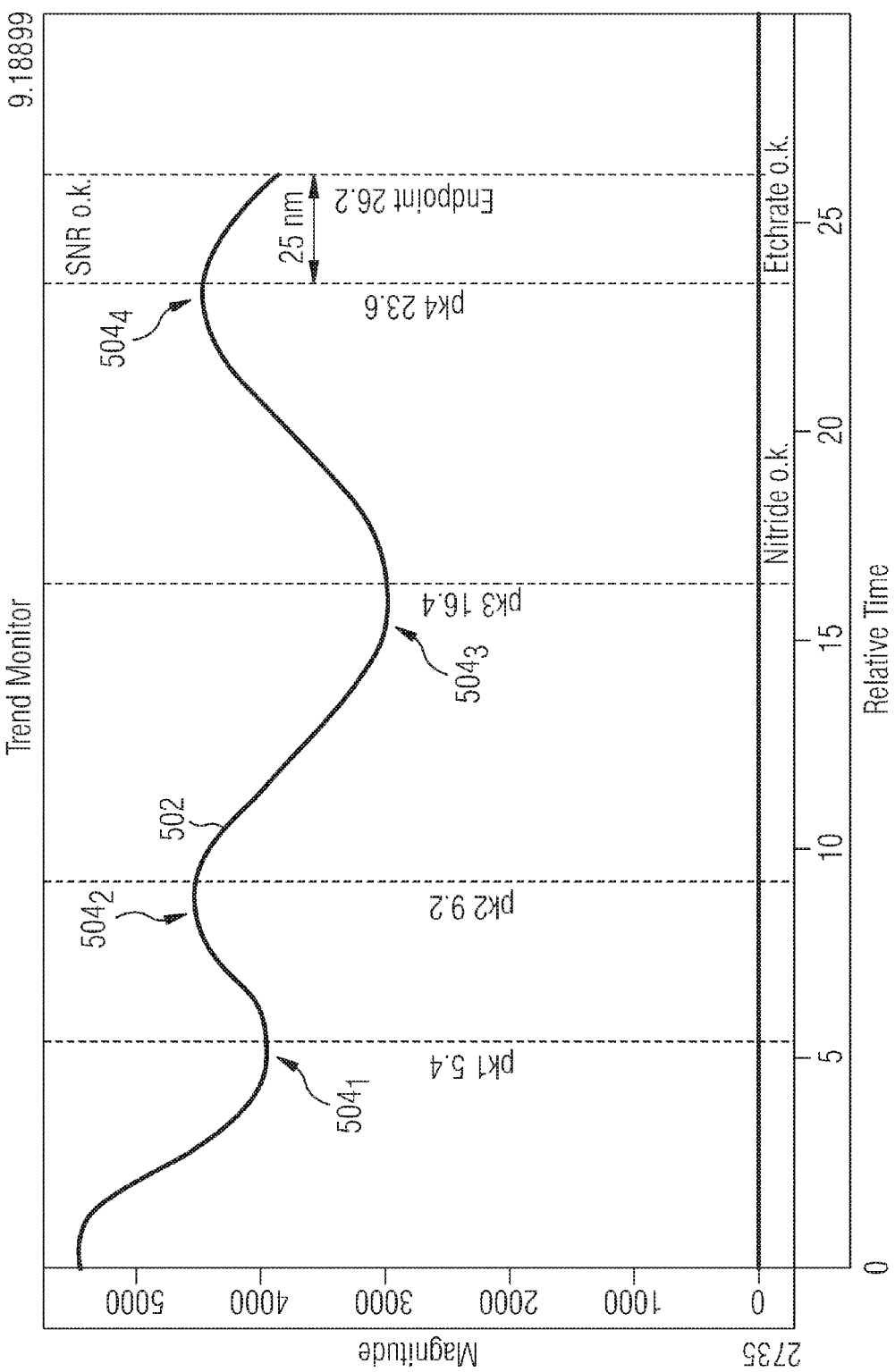

METHOD OF DETERMINING THE DEPTH PROFILE OF A SURFACE STRUCTURE AND SYSTEM FOR DETERMINING THE DEPTH PROFILE OF A SURFACE STRUCTURE

BACKGROUND

It is known to determine a depth profile of a surface structure using interferometric effects. The determination of the depth profile enables control of the formation of a surface structure of a layer or a compound of layers like a semiconductor layer or a compound of semiconductor layers.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 1 shows a schematic drawing illustrating a method of determining a depth profile of a surface structure;

FIG. 2A shows a processing stage of a method of determining a trend curve during the formation of a surface structure;

FIG. 2B shows a processing stage of a method of determining a trend curve during the formation of a surface structure;

FIG. 2C shows a processing stage of a method of determining a trend curve during the formation of a surface structure;

FIG. 3 shows a method of determining the depth profile of a surface structure according to one embodiment of the present invention;

FIG. 4 shows a system for determining the depth profile of a surface structure according to one embodiment of the present invention;

FIG. 5B shows a trend curve obtained when using irradiation light having multiple wavelengths.

DETAILED DESCRIPTION OF ILLUSTRATIVE EMBODIMENTS

Figure 5A:
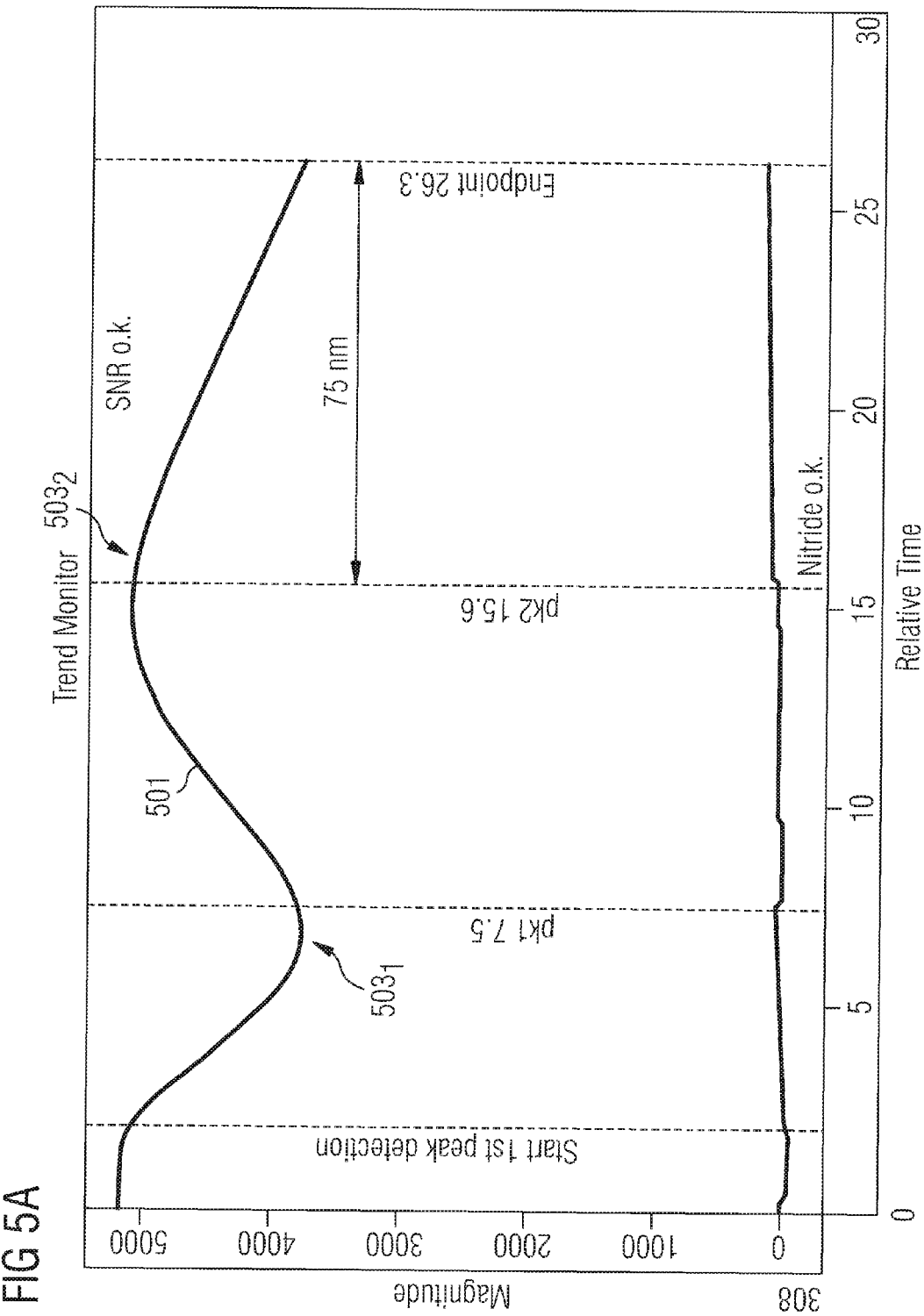
FIG. 5A shows a trend curve obtained when using irradiation light having a fixed wavelength.

FIG. 1 shows a method of determining a depth profile of a surface structure using interferometric effects.

Here, it is assumed that the surface structure 100 shown in FIG. 1 is a trench 101 formed within a layer 102, for example, a substrate layer of a semiconductor device. The surface structure 100 is irradiated with irradiation light 103. The irradiation light 103 is reflected at the surface structure 100, thereby (at least partially) being converted into reflection light 104. The irradiation light 103 is coherent light, i.e., light consisting of light components having a fixed phase difference between each other. In the embodiment shown in FIG. 1, it is assumed that the phase difference between different light components of the irradiation light 103, for example, between a first light component 105 and a second light component 106 is zero. This phase difference is changed when the irradiation light 103 is reflected at the surface structure 100, and becomes reflected light 104. So the phase difference between the first light component 105 and the second light component 106 within the reflection light 104 is in contrast to the irradiation light 103 different from zero. In the embodiment shown in FIG. 1, it is assumed that the phase difference caused by the reflection of the irradiation light 103 at the surface structure 100 is $\lambda/4$. This results from an optical retardation between the first light component 105 and the second light component 106, respectively. The second light component 106 has a longer way before it becomes reflected light 104, and has the same way back before it reaches the same point as the first light component 105 as reflected light 104. Since the phase difference between the first light component 105 and the second light component 106 within the reflection light 104 is different from zero, the intensity of the reflection light is changed in dependence of the optical retardation. The intensity of the reflected light 104 has its maximum if the "optical path difference" (OPD, the difference of the path length multiplyed by the refraction index of the both light components 105, 106) is zero (e.g., if the depth of the trench 101 is zero) or an integer multiple of the wavelength (e.g., for specific depth values of the trench 101), and its minimum if the depth of the trench 101 is an integer and a half multiple of the wavelength. Thus, by determining the intensity of the reflection light 104, it is possible to obtain data concerning the depth profile of the surface structure 100.

The method illustrated in FIG. 1 is used in order to control the process of generating a surface structure as shown in FIGS. 2A to 2C.

FIG. 2A shows a processing stage A in which a surface structure 200 has been formed. The surface structure 200 shows a trench 201 having a first depth 202. It is assumed that the trench 201 is formed within a substrate layer 203 using an etching process. At the processing stage A shown in FIG. 2A, due to the depth 202 of the trench 201, the reflection light 104 consists of light components having a phase difference of zero between each other. Thus, the intensity of the reflection light 104 has a maximum value 204, as shown in the right part of FIG. 2A.

FIG. 2B shows a processing stage B in which a surface structure 200' has been formed. The surface structure 200' has a trench 201, the depth 202' of which, compared to the trench 201 shown in the processing stage A, being larger due to the continued etching process. Due to the enlarged depth 202', the light components of the reflection light 104 show a non-zero phase difference between each other (here: a phase difference of $\lambda/2$). As a consequence, the intensity of the reflection light 104 is reduced to a minimum value 204', as shown in the right part of FIG. 2B.

FIG. 2C shows a processing stage C in which a surface structure 200" has been formed. The surface structure 200" has a trench 201, the depth 202" of which, compared to the trench 201 shown in the processing stage B, being larger due to the continued etching process. As a consequence, the light components within the reflection light 104 show again a phase difference of zero between each other. As a consequence, the intensity of the reflection light 104 is increased to a maximum value 204", as shown in the right part of FIG. 2B.

In this way, a trend curve 205 is generated which indicates the intensity of the reflection light 104 during the formation of the trench 201. The depth 202 of the trench 201 at a given time instance can be determined by detecting the number and positions of minima/maxima 204, 204', 204" and turning points between the minima/maxima 204, 204', 204" within the trend curve 205 at the time instance. The speed of the trench formation process (e.g., the speed of an etching process which forms the trench 201) can be determined/controlled by repeatedly determining the depth of the trench 201.

The higher the number of the minima/maxima (or turning points) 204 within the trend curve 205, the higher the precision of determining the depth 202 of the trench 201 is. Therefore, according to one embodiment of the present invention, a method of determining the depth profile of a surface structure is provided, wherein the trend curves used show an increased number of minima/maxima (or turning points), compared to a standard depth profile determining methods.

Alternatively, a higher precision of determining the depth 202 of the trench 201 is achievable, if an extreme value (minimum/maximum) or turning point within the trend curve 205 is correlated to a depth which comes as close as possible to (however is smaller than) the target depth. Therefore, according to one embodiment of the invention, a method of determining the depth profile of a surface structure is provided, wherein the trend curves used show optimized occurrence of minima/maxima (or turning points), compared to standard depth profile determining methods (the minima/maxima or turning points are correlated to a depth which comes as close as possible to (however is smaller than) the target depth). If a minimum/maximum or a turning point is correlated to a depth being very close to the target depth, one minimum/maximum or one turning point within a trend curve is sufficient.

FIG. 3 shows a method 300 of determining the depth profile of a surface structure according to one embodiment of the present invention. At 301, the surface structure is irradiated with irradiation light including light components of different wavelengths. At 302, the depth profile of the surface structure is determined in dependence on interferometric effects caused by the reflection of the irradiation light at the surface structure.

According to one embodiment of the present invention, at 301, the surface structure is irradiated with irradiation light during the formation of the surface structure in order to generate a corresponding trend curve which reflects the change of the depth profile over time.

According to one embodiment of the present invention, the intensities of the light components of the reflection light are weighted at 302 in dependence on corresponding light component weighting factors. That is, light is irradiated and reflected without any manipulation, wherein from the reflection light, using a detector, reflection intensity raw data is obtained. The reflection intensity raw data is then weighted, i.e., the reflection intensities of different light wavelengths are weighted.

According to one embodiment of the present invention, the light component weighting factors are determined using the following processes: a) generating an auxiliary surface structure being identical or similar to the surface structure to be determined; b) irradiating the auxiliary surface structure during its formation with light having a fixed wavelength; c) measuring the light reflected by the auxiliary surface structure; d) generating a corresponding auxiliary trend curve in dependence on the measured reflected light; e) carrying out steps b) to d) several times, each time using light having a different fixed wavelength; and f) determining the light component weighting factors in dependence on the auxiliary trend curves determined. Step e) may be done simultaneously for all desired wavelengths.

According to one embodiment of the present invention, the light component weighting factors are chosen at 302 in dependence on data concerning the depth profile of the surface structure.

According to one embodiment of the present invention, the surface structure is generated using an etching process.

According to one embodiment of the present invention, the surface structure is generated using an etching process of constant etching speed. However, the etching speed does not have to be constant.

According to one embodiment of the present invention, the light component weighting factors are determined for application at 302 using a principal component analysis (PCA).

With the PCA method the full spectra is decomposed into its linear independent components. The resulting weighting vectors combine the individual wavelength channels into groups (components) with similar interference signals. This set of noise-reduced component signals is used within a second step to form a suited linear superposition providing the final interference time signal.

For any given target oscillation frequency the target phase is optimized using a nonlinear optimization procedure with an underlying linear weight estimation for the PCA component signals.

The target oscillation frequency will be increased until there is no suited modeling possible anymore. This finally yields to a spectral channel combination that performs a fast oscillating low noise interference signal.

According to one embodiment of the present invention, the light component weighting factors are determined such that the trend curve has as much extreme values and turning points (minima/maxima) as possible.

According to one embodiment of the present invention, the light component weighting factors are determined such that the trend curve has an optimized occurrence of the extreme values and turning points. According to one embodiment of the present invention, "optimized occurrence" means that the minima/maxima or turning points are correlated to a depth which comes as close as possible to (however is smaller than) the target depth.

According to one embodiment of the present invention, the light component weighting factors are determined such that at 301 noise components or drift components within the reflected irradiation light are compensated or reduced.

According to one embodiment of the present invention, a method of determining the depth profile of a surface structure is provided, the method including: forming a surface structure within a layer or a composite structure including a plurality of layers; irradiating the surface structure during its formation with irradiation light including light components of different wavelengths, thereby generating a trend curve in dependence on interferometric effects caused by the reflection of irradiation light at the surface structure, wherein the trend curve reflects the change of the depth profile over the time.

FIG. 4 shows a system 400 for determining the depth profile of a surface structure. The system 400 includes: a light irradiating unit 401 configured to irradiate the surface structure 100 with irradiation light 103 including light components of different wavelengths; a light receiving unit 402 configured to receive reflection light 104 which is generated by reflecting the irradiation light 103 at the surface structure 100; a determining unit 403 which is coupled to the light receiving unit 402 and which determines the depth profile of the surface structure 100 in dependence on interferometric effects occurring within reflection light 104 received by the light receiving unit 402.

According to one embodiment of the present invention, the system 400 includes a trend curve generating unit (which may, for example, be located within the determining unit 403) which generates a trend curve of the surface structure 100 by processing interferometric effects detected within the reflection light 104 during the formation of the surface structure 100.

According to one embodiment of the present invention, the determining unit 403 is configured to determine the depth profile of the surface structure 100 in dependence on the detected trend curve.

According to one embodiment of the present invention, the determining unit 403 is configured to weight the reflection light 104 intensities in dependence on corresponding light component weighting factors.

According to one embodiment of the present invention, the system 400 includes a light component weighting factor determining unit which is configured to determine the light component weighting factors in dependence on additional trend curves, each additional trend curve reflecting the change of the depth profile of the surface structure 100 over time, wherein each additional trend curve has been generated using irradiation light having only unweighted wavelengths of the desired wavelength range.

According to one embodiment of the present invention, the light component weighting factor determining unit is configured to determine the light component weighting factors by subjecting the additional trend curves to a principal component analysis.

According to one embodiment of the present invention, the light component weighting factor determining unit is configured to determine the light component weighting factors such that the resulting trend curve has as many extreme values and turning points (minima/maxima) as possible.

According to one embodiment of the present invention, the light component weighting factor determining unit is configured to determine the light component weighting factors such that the resulting trend curve has an optimized occurrence of extreme values and turning points. According to one embodiment of the present invention, "optimized occurrence" means that the minima/maxima or turning points are correlated to a depth which comes as close as possible to (however is smaller than) the target depth. In this case, only one minimum or maximum or turning point within the resulting trend curve is necessary.

According to one embodiment of the present invention, the light component weighting factor determining unit is configured to determine the light component weighting factors such that noise components or drift components included within the resulting trend curve are compensated or reduced.

According to one embodiment of the present invention, a system for determining the depth profile of a surface structure is provided, including: an irradiating means which irradiates the surface structure with irradiation light including light components of different wavelengths; a receiving means which receives reflection light generated by reflecting the irradiation light at the surface structure; and a determining means which determines the depth profile of the surface structure in dependence on interferometric effects of reflection light received by the receiving means.

The irradiating means may, for example, be a light irradiating unit, the receiving means may, for example, be a light receiving unit, and the determining means may, for example, be a determining unit.

FIG. 5A shows a trend curve 501 obtained when irradiating a surface structure during its formation using irradiation light having a fixed wavelength. In contrast, FIG. 5B shows a trend curve 502 obtained when irradiating the same surface structure during its formation, however using irradiation light having different wavelengths. As can be derived from FIGS. 5A and 5B, the trend curve 501 has only two extreme values $503_1$ and $503_2$, whereas the trend curve 502 shown in FIG. 5B has four extreme values $504_1$, $504_2$, $504_3$ and $504_4$. Since the formation of the depth profile of the surface structure can be controlled better if the trend curve shows more extreme values, the trend curve 502 enables a better control of the formation of the depth profile.

As can be derived from FIGS. 5A and 5B, the last extreme value (maxima) $503_2$ of the trend curve 501 shown in FIG. 5A has a longer distance to the target point at the right hand side of the trace compared to the last maximum $504_4$ of the trend curve 502 shown in FIG. 5B. The longer distance of the last extreme value (maxima) $503_2$ implies a decreased precision, compared to the shorter distance of the last maximum $504_4$.

In the following description, further aspects of exemplary embodiments of the present invention will be explained.

Depth control of holes or trenches is necessary when fabricating devices. The depth control can be performed using interferometric effects. Generally, the smallest depth which can be measured using interferometric effects corresponds to the half wavelength of irradiation light used. However, due to technical reasons, it is often not possible to use such a wavelength.

A first example of using interferometric effect based depth control is tool monitoring applied during deep trench etching processes. The tool monitoring is carried out using a so called chemical-mechanical polishing short loop wafer processing procedure. The deep trench etching process is carried out on structured wafers. The structured wafers are then polished down to about 2 or about 6 micrometer in order to be able to control the critical dimension (CD) parameters of the respective depths at several testing spots. A criteria for monitoring CMP (chemical mechanical polishing) devices is the (rest) depth measurement of the holes using Fourier Transformation Infrared Spectroscopy (FTIR). The measurement can be performed at about 6 micrometers using an IR wavelength of about 800 nanometers since the rest depth may be possibly smaller than about 500 nanometers and may therefore be close to the half wavelength.

A second example of using interferometric effect based depth control is end point control of shallow poly silicon recess etches which is performed using interferometric depth monitoring. The UV wavelength of about 229 nanometers which is used also lies within the fringe range of the total depth to be determined (about 190 nanometer). The reliability of this depth measurement does not fulfill the requirements of the process control. The wavelength used is the smallest available wavelength for the system used.

In order to determine a depth profile, usually a single wavelength is used. Then, a significant reproducible point is searched within the trend curve of the intensity of the wavelength (i.e., directly within the interference signal or within one of its derivatives) which can be used for the determination of the depth profile using a smoothing process, or one or several derivations and corrections. This characteristical points are extreme values, like minimum values, maximum values or turning points. The depths corresponding to these extreme values are known from the beginning and may, for example, be determined using comparable measurements of other measurement procedures. From there it is extrapolated to unknown depths which should be as close as possible to this extreme value. The more extreme values can be determined, the more exactly the measurement.

Furthermore, the measurement is more exact, if the last characteristic point of the trace is close to the target depth.

The fringe count method provided as a standard method for recess depth determination is only possible for deeper recess etches. For shallow recesses, this method is not accurate enough.

If the depth profile to be measured is a shallow depth profile, it may be possible to use small wavelengths in order to generate an interference signal having as many extreme values as possible. However, when trying to do this, technical problems arise for very small wavelengths (deep UV (ultra-violet)) since materials have to be used which do not absorb these wavelengths, however at the same time have to be etch resistant. As a consequence, such interference devices are very expensive. For example, UV systems which are capable of using wavelengths lower than about 200 nanometers for end point detection are not known.

According to one embodiment of the present invention, several wavelengths are used for depth profile detection when only using one wavelength. The time trend curves of the interference signals of these wavelengths are measured. This is possible using known systems. The interference signals of the single wavelengths are combined into a resulting interference signal using positive or negative weights. The resulting trend curve of the combined interference signal has more usable extreme values than each of the single trend curves.

According to one embodiment of the present invention, a suitable weighting vector (pattern) is determined using a principal component analysis. In order to do this, some data sets (a data set consists of a matrix including the time dependent intensities of the corresponding wavelength of the reflected light used are subjected to a principal component analysis, wherein the weighting vector is derived from the results of the principal component analysis. The scalar product out of the weighting vector and the interference signals yields the resulting trend curve of the combined interference signal. If a suitable weighting vector is used, the resulting trend curve shows the desired interference signal.

One effect of this embodiment is that common devices may be used in order to generate interference signals. In contrast, if only single wavelengths were used, hardware component modifications would be necessary which would result in increased costs. In the worst case, such hardware components would not be available. According to one embodiment of the present invention, an interferometric depth profile determination of shallow depths is possible having a high precision and not resulting in too high costs. Further, according to one embodiment of the present invention, it is possible to compensate noise components and drift components, and to amplify interference components using a suitable superpositioning process. In this way, an improvement of the signal-noise ratio can be achieved.

According to one embodiment of the present invention, a weighting vector is generated using a principal component analysis. An interference signal can be generated which enables to determine a depth profile of sufficient precision by forming a scalar product out of the spectrum which varies over the time and the weighting vector. In other words, a scalar product is formed out of the weighting factor and the time trend curves of the interference signals of the corresponding wavelengths in order to generate a combined interference signal.

The embodiments of the method according to the present invention may, for example, be used within an end point detection method during a poly silicon recess etching step for shallow target depths within the production of DRAM memory devices: by doubling the extreme values (corresponding to a DUV wavelength (deep ultra violet) of about 170 nanometer), the distance which had to be covered "blind" could be reduced to one third (from about 75 nanometers to about 25 nanometers), which is shown in FIGS. 5A and 5B. FIG. 5A shows the situation without using the embodiments according to the present invention. In this case, about 75 nanometers have to be etched "blind" during which it is assumed that the circumstances that influence the etching rate are constant. The about 75 nanometers correspond to 40% of the total depth. FIG. 5B shows the case where the embodiments according to the present invention have been deployed.

The same structure as in FIG. 5A has been etched. However, only about 25 nanometers have to be etched "blind", i.e., it had to be assumed that during etching the about 25 nanometers the circumstances influencing the etching rate are constant. The about 25 nanometers correspond to about 15% of the total depth.

Further application examples of the embodiments of the present invention are, e.g., a deep trench monitoring or an end point termination for a L90 deglaze process. Further, the embodiments of the present invention may, e.g., be applied to the end point determination of a soft landing step in a gate contact etching process used to manufacture all kinds of technologies and products.

According to one embodiment of the present invention, a deep trench etching process may, for example, mean an etching of trenches having a depth of about 7 micrometer into a wafer. According to one embodiment of the present invention, shallow poly silicon recess etch processes are, for example, processes in which polycrystalline silicon that had been filled into deep trenches has been etched back to a predetermined depth. According to one embodiment of the present invention, "L90" may, for example, be a logic technology within about 90 nanometers technology. According to one embodiment of the present invention, a "deglaze" process may, for example, mean an etch back process of oxide within a shallow trench isolation (an STI) to a predetermined depth in order to tune the STI step height.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method of determining a depth profile of a surface structure, the method comprising:
   irradiating the surface structure with irradiation light comprising light components of different wavelengths; and
   determining the depth profile of the surface structure in dependence on interferometric effects caused by reflection of the irradiation light at the surface structure,
   wherein intensities of the light components of the reflection of the irradiation light are weighted in dependence on corresponding light component weighting factors,
   wherein the light component weighting factors are determined by:
   a) generating an auxiliary surface structure that is identical or similar to the surface structure to be measured,
   b) irradiating the auxiliary surface structure during its formation with light having a fixed wavelength,
   c) measuring light reflected by the auxiliary surface structure,
   d) generating a corresponding auxiliary trend curve in dependence on the measured reflected light,
   e) carrying out steps b) to d) several times, each time using light having a different fixed wavelength, and
   f) determining the light component weighting factors in dependence on the auxiliary trend curves determined.

2. The method according to claim 1, wherein the light component weighting factors are determined in dependence on data concerning the depth profile of the surface structure.

3. The method according to claim 1, wherein the surface structure is generated using an etching process.

4. The method according to claim 1, wherein the light component weighting factors are determined using a principal component analysis.

5. The method according to claim 1, wherein the light component weighting factors are determined such that the trend curve has as many extreme values as possible.

6. The method according to claim 1, wherein the light component weighting factors are determined such that the trend curve has an optimized occurrence of extreme values.

7. The method according to claim 1, wherein the light component weighting factors are determined such that noise components or drift components within the reflected irradiation light is compensated or reduced.

8. A method of determining a depth profile of a surface structure, the method comprising:
   irradiating the surface structure with irradiation light comprising light components of different wavelengths; and
   determining the depth profile of the surface structure in dependence on interferometric effects caused by reflection of the irradiation light at the surface structure,
   wherein intensities of the light components of the reflection of the irradiation light are weighted in dependence on corresponding light component weighting factors,
   wherein the light component weighting factors are determined by:
   a) generating an auxiliary surface structure that is identical or similar to the surface structure to be measured,
   b) irradiating the auxiliary surface structure during its formation with light having a fixed wavelength,
   c) measuring light reflected by the auxiliary surface structure,
   d) generating a corresponding auxiliary trend curve in dependence on the measured reflected light,
   e) carrying out steps b) to d) simultaneously for a plurality of different fixed wavelengths, and
   f) determining the light component weighting factors in dependence on the auxiliary trend curves determined.

9. The method according to claim 8, wherein the light component weighting factors are determined using a principal component analysis.

10. The method according to claim 8, wherein the light component weighting factors are determined such that the trend curve has as many extreme values as possible.

11. The method according to claim 8, wherein the light component weighting factors are determined such that the trend curve has an optimized occurrence of extreme values.

12. The method according to claim 8, wherein the light component weighting factors are determined such that noise components or drift components within the reflected irradiation light is compensated or reduced.

13. A system determining a depth profile of a surface structure, the system comprising:
   a light irradiating unit which irradiates the surface structure with irradiation light comprising light components of different wavelengths;
   a light receiving unit which receives reflection light generated by reflecting the irradiation light at the surface structure;
   a determining unit which determines the depth profile of the surface structure in dependence on interferometric effects of reflection light received by the light receiving unit;
   a trend curve generating unit which generates a trend curve of the surface structure by processing the interferometric effects detected within the reflection light during the formation of the surface structure; and
   a light component weighting factor determining unit that determines light component weighting factors in dependence on additional trend curves which reflect the change of the depth profile of the surface structure over time and which have been generated using irradiation light having only one fixed wavelength.

14. The system according to claim 13, wherein the determining unit is configured to determine the depth profile of the surface structure in dependence on the trend curve generated by the trend curve generating unit.

15. The system according to claim 13, wherein the light component weighting factor determining unit is configured to determine the light component weighting factors by subjecting the additional trend curves to a principal component analysis.

16. The system according to claim 13, wherein the light component weighting factor determining unit is configured to determine the light component weighting factors such that the resulting trend curve has as many extreme values as possible.

17. The system according to claim 13, wherein the light component weighting factor determining unit is configured to determine the light component weighting factors such that the resulting trend curve has an optimized occurrence of extreme values.

18. The system according to claim 13, wherein the light component weighting factor determining unit is configured to determine the light component weighting factors such that noise components or drift components included within the resulting trend curve is compensated or reduced.

19. A system determining a depth profile of a surface structure, the system comprising:
   irradiating means for irradiating the surface structure with irradiation light comprising light components of different wavelengths;
   receiving means for receiving reflection light generated by reflecting the irradiation light at the surface structure; and
   determining means for determining the depth profile of the surface structure in dependence on interferometric effects of reflection light received by the receiving means;
   trend curve generating means for generating a trend curve of the surface structure by processing the interferometric effects detected within the reflection light during the formation of the surface structure; and
   light component weighting factor determining means for determining light component weighting factors in dependence on additional trend curves which reflect the change of the depth profile of the surface structure over time and which have been generated using irradiation light having only one fixed wavelength.

* * * * *